(12) United States Patent
Uchimura

(10) Patent No.: US 12,505,403 B2
(45) Date of Patent: Dec. 23, 2025

(54) IC TAG ATTACHING APPARATUS AND IC TAG ATTACHING METHOD

(71) Applicant: NEC Corporation, Tokyo (JP)

(72) Inventor: Jun Uchimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/727,161

(22) PCT Filed: Jan. 18, 2022

(86) PCT No.: PCT/JP2022/001610
§ 371 (c)(1),
(2) Date: Jul. 8, 2024

(87) PCT Pub. No.: WO2023/139648
PCT Pub. Date: Jul. 27, 2023

(65) Prior Publication Data
US 2025/0104002 A1    Mar. 27, 2025

(51) Int. Cl.
*G06Q 10/0833* (2023.01)
(52) U.S. Cl.
CPC ................. *G06Q 10/0833* (2013.01)
(58) Field of Classification Search
CPC .................................................. G06Q 10/0833
See application file for complete search history.

(56) References Cited

FOREIGN PATENT DOCUMENTS

| JP | H09231473 A | * | 9/1997 | ............... G07G 1/06 |
|----|---|---|---|---|
| JP | 2001-205199 A | | 7/2001 | |
| JP | 2005-254170 A | | 9/2005 | |
| JP | 2020-055656 A | | 4/2020 | |
| JP | 2020091741 A | * | 6/2020 | ............. G06K 19/07 |
| JP | 2020-196602 A | | 12/2020 | |

OTHER PUBLICATIONS

International Search Report for PCT Application No. PCT/JP2022/001610, mailed on Apr. 5, 2022.

* cited by examiner

*Primary Examiner* — Kristy A Haupt
(74) *Attorney, Agent, or Firm* — Sughrue Mion, PLLC

(57) ABSTRACT

An IC tag attaching apparatus (10) includes a detecting unit (110), a writing unit (120), and an attaching unit (130). The detecting unit (110) detects that a parcel is placed in a predetermined area. The writing unit (120) acquires parcel identification information to be provided for the parcel, and causes an IC tag to store the parcel identification information. The attaching unit (130) attaches the IC tag to the parcel. When the IC tag is integrated with an invoice of the parcel, the attaching unit (130) attaches the invoice to the parcel.

11 Claims, 5 Drawing Sheets

IC TAG ATTACHING APPARATUS AND IC TAG ATTACHING METHOD

This application is a National Stage Entry of PCT/JP2022/001610 filed on Jan. 18, 2022, the contents of all of which are incorporated herein by reference, in their entirety.

BACKGROUND ART

As one application of an IC tag, there is management of a parcel. Patent Document 1, for example, describes that transportation information including a zip code and an ID code is written in a wireless tag and the wireless tag is attached to a transportation object, and thereby, based on the transportation information acquired from the wireless tag attached to the transportation object, the transportation object is transported.

Further, Patent Document 2 discloses the following technique. First, a delivery object is attached with an information storage medium. Further, the delivery object is sorted into any of a plurality of delivery object sorting units. The delivery object sorting unit is provided for each delivery area. A delivery object sorting apparatus writes, in an information storage medium of the delivery object in a non-contact manner, destination information relevant to sorting unit identification information of the delivery object sorting unit into which the delivery object is sorted.

RELATED DOCUMENT

Patent Document

Patent Document 1: Japanese Patent Application Publication No. 2001-205199
Patent Document 2: Japanese Patent Application Publication No. 2005-254170

DISCLOSURE OF THE INVENTION

Technical Problem

It is desired that work at a time of receiving a parcel to be delivered is saved. One example of an object of the present invention is to save work at a time of receiving a parcel to be delivered.

Solution to Problem

According to one aspect of the present invention, provided is an IC tag attaching apparatus including:
a detecting unit that detects that a parcel is placed in a predetermined area;
a writing unit that acquires parcel identification information to be provided for the parcel, and causes an IC tag to store the parcel identification information; and
an attaching unit that attaches the IC tag to the parcel.
According to the present invention, provided is an IC tag attaching method including,
by an IC tag attaching apparatus, executing:
detecting processing of detecting that a parcel is placed in a predetermined area;
writing processing of acquiring parcel identification information to be provided for the parcel, and causing an IC tag to store the parcel identification information; and
attaching processing of attaching the IC tag to the parcel.

Advantageous Effects of the Invention

According to one aspect of the present invention, work at a time of receiving a parcel to be delivered can be saved.

BRIEF DESCRIPTION OF THE DRAWINGS

The above-described object, other objects, features, and advantages will become more apparent from preferred example embodiments described below and the following accompanying drawings.

EXAMPLE EMBODIMENT

Hereinafter, an example embodiment according to the present invention is described by using the accompanying drawings. Note that in all drawings, a similar component is assigned with a similar reference sign, and description thereof is omitted as appropriate.

Figure 1:
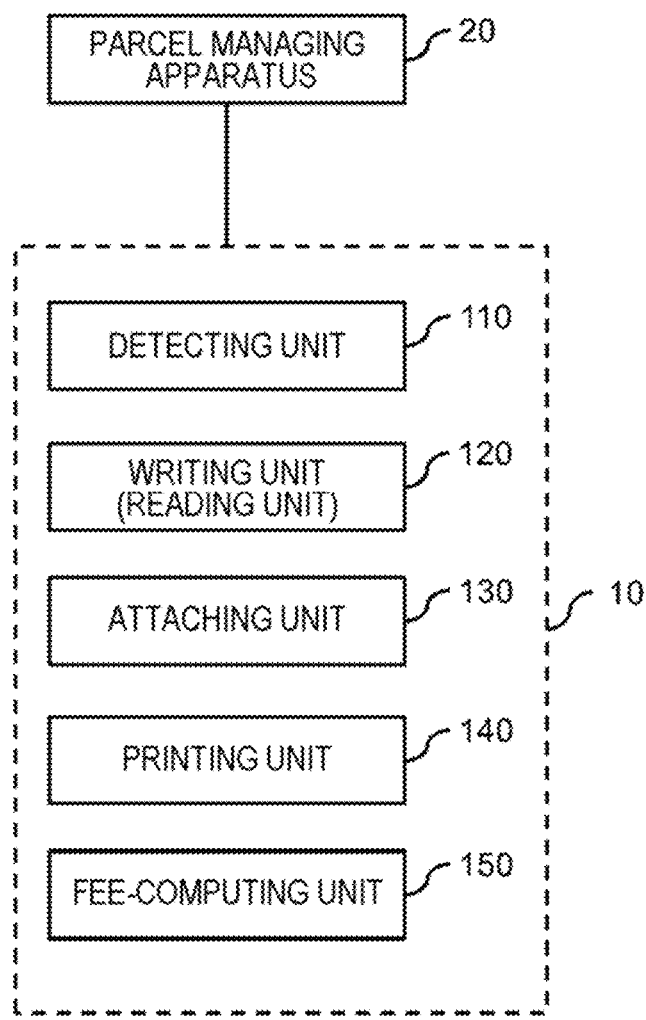
FIG. 1 is a diagram illustrating one example of a function configuration of an IC tag attaching apparatus according to an example embodiment.

FIG. 1 is a diagram illustrating one example of a function configuration of an IC tag attaching apparatus 10 according to an example embodiment. The IC tag attaching apparatus 10 is installed, for example, in a store selling a product or in a parking lot of the store. The IC tag attaching apparatus 10 is an apparatus that receives, from a customer, a parcel to be delivered, and is used together with a parcel managing apparatus 20. The parcel managing apparatus 20 is managed by a delivery company which delivers a parcel.

The IC tag attaching apparatus 10 attaches an IC tag to a received parcel. Via wireless communication, information is written in the IC tag, and also the written information is read from the IC tag. The IC tag stores at least parcel identification information. The parcel managing apparatus 20 manages, by using the parcel identification information, a delivery state of a parcel.

The IC tag attaching apparatus 10 includes a detecting unit 110, a writing unit 120, and an attaching unit 130.

In the IC tag attaching apparats 10, an area where a customer places a parcel is set. Hereinafter, the area is referred to as a predetermined area. The detecting unit 110 detects that a parcel is placed in the predetermined area. The detecting unit 110 includes, for example, a sensor for detecting a parcel being present in the predetermined area. One example of the sensor is, but not Further, the detecting unit 110 computes, limited to, an image capture sensor. by using a detection result of the sensor, a size of a parcel, for example, a vertical width, a horizontal width, and a height.

The writing unit 120 causes an IC tag to store parcel identification information allocated to a parcel detected by the detecting unit 110. In the processing, the writing unit 120 writes, in the IC tag, the parcel identification information, for example, by using short-distance radio communication.

The writing may be executed before the IC tag is attached to a parcel, or may be executed after the IC tag is attached to a parcel. The writing may be executed in the above-described predetermined area, or may be executed after a parcel is delivered to a location different from the predetermined area.

The writing unit 120 may further cause an IC tag to store delivery information, in addition to parcel identification information. The delivery information includes at least one of information relating to a sender of a parcel, information relating to a destination, information relating to handling of a parcel, and a desired delivery date and time. The information relating to a sender of a parcel includes, for example, a name, an address, and a phone number of a sender. The information relating to a destination of a parcel includes, for example, a name, an address, and a phone number of a destination. The information relating to handling of a parcel is at least one of information indicating a handling method for a parcel being delivered, for example, information indicating any of do not turn upside down, perishable, precision machine, and fragile, and information indicating that another parcel is prohibited to be placed on the parcel.

The delivery information is input, for example, by a customer, to the IC tag attaching apparatus 10. The input may be executed, for example, by using a keyboard (including a keyboard displayed on a touch panel), or by using an optical character reader (OCR) function.

Further, a customer may register, in the parcel managing apparatus 20, delivery information before bringing a parcel to the IC tag attaching apparatus 10. In this case, from the parcel managing apparatus 20, identification information, for example, a code of the delivery information is transmitted to a terminal of the customer. The customer inputs, instead of directly inputting delivery information to the IC tag attaching apparatus 10, the identification information to the IC tag attaching apparatus 10. Then, the IC tag attaching apparatus 10 transmits the identification information to the parcel managing apparatus 20. The parcel managing apparatus 20 transmits delivery information relevant to the identification information to the IC tag attaching apparatus 10.

The writing unit 120 transmits, to the parcel managing apparatus 20, parcel identification information stored in the IC tag, together with location information indicating a location where the IC tag attaching apparatus 10 is installed, for example, an address or store identification information. The parcel managing apparatus 20 causes a storage apparatus to store the location information in association with the parcel identification information.

Preferably, the writing unit 120 further transmits, to the parcel managing apparatus 20, at least a part of the delivery information, preferably, all delivery information. In this case, the parcel managing apparatus 20 also causes the storage apparatus to store the delivery information in association with the parcel identification information.

Note that, a parcel passes through a plurality of relay points until being delivered to a destination. At each relay point, a worker reads parcel identification information from an ID tag of the parcel, and transmits the read parcel identification information to the parcel managing apparatus 20, together with information identifying the relay point. The parcel managing apparatus 20 also stores these pieces of information. Thereby, the parcel managing apparatus 20 can manage a delivery status of the parcel.

Further, the writing unit 120 doubles as a reading unit, and reads, as necessary, information written in an IC tag.

The attaching unit 130 attaches an IC tag to a parcel. The attachment may be executed when the parcel is present in the above-described predetermined area, or may be executed after the parcel is transported to a location different from the predetermined area.

A parcel to be delivered is frequently attached with an invoice. A printing unit 140 prints, when a parcel is attached with an invoice, a part of delivery information on the invoice. In this case, on the invoice, parcel identification information and at least a part of delivery information are displayed. The parcel identification information may be displayed, for example, as a code. The code may be any of a bar code and a two-dimensional code. The parcel identification information may be previously printed on an invoice before delivery information is printed on the invoice, or may be printed on an invoice, together with at least a part of delivery information.

Then, an IC chip may be integrated with an invoice.

Note that, the writing unit 120 may acquire, from the parcel managing apparatus 20, parcel identification information to be written in an IC tag. In this case, the writing unit 120 requests, for example, after the detecting unit 110 detects a parcel, parcel identification information from the parcel managing apparatus 20.

Further, when an invoice is attached to a parcel, there is a case where parcel identification information is previously printed on the invoice. In this case, an IC tag may previously store the parcel identification information. Further, the writing unit 120 may read the parcel identification information from the invoice, and cause the IC tag to store the parcel identification information.

The IC tag attaching apparatus 10 further includes a fee-computing unit 150. The fee-computing unit 150 computes, by using a size of a parcel computed by the detecting unit 110, a location where the parcel managing apparatus 20 is installed, for example, an address, and an address of a destination, a delivery fee of the parcel.

Figure 2:
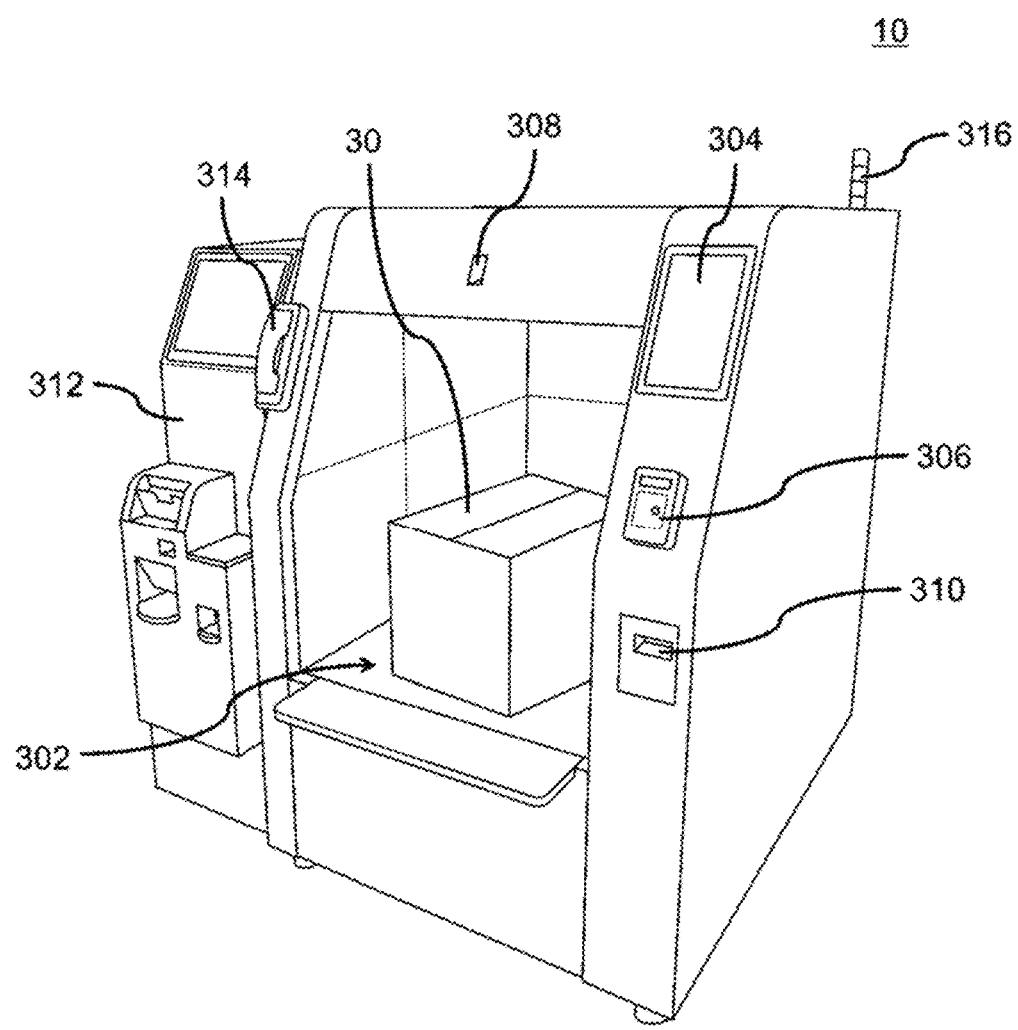
FIG. 2 is a diagram illustrating one example of a hardware configuration of the IC tag attaching apparatus.

FIG. 2 is a diagram illustrating one example of a hardware configuration of the IC tag attaching apparatus 10. The IC tag attaching apparatus 10 includes, on a front face side, an opening for placing a parcel 30, i.e., a predetermined area 302. On an internal surface of the opening being the predetermined area 302, a sensor of the detecting unit 110 described in FIG. 1 is disposed.

Further, the IC tag attaching apparatus 10 includes, on a front face, various types of interfaces for a customer. The interface includes an input unit 304, a code reader 306, a claim check output unit 310, a settlement apparatus 312, and an interphone 314.

The input unit 304 includes, for example, a touch panel-type display. A customer inputs, as necessary, at least a part of delivery information to the IC tag attaching apparatus 10 via the input unit 304.

The code reader 306 reads a code from a medium displaying code information, for example, paper or a display of a mobile terminal. The code is associated with delivery information previously input to the parcel managing apparatus 20, for example, by a customer. The writing unit 120 acquires, when the code reader 306 reads a code, the delivery information from the parcel managing apparatus 20, by using the code.

The claim check output unit 310 outputs a claim check being a copy of an invoice. At least some of apparatuses for achieving the printing unit 140 are located on a back side of the claim check output unit 310.

The settlement apparatus 312 executes settlement processing for a delivery fee.

The interphone 314 is provided in order to receive a question relating to the IC tag attaching apparatus 10 from a customer, and is connected to a call center.

The IC tag attaching apparatus 10 further includes a human body sensor 308 and an indication light 316.

The human body sensor 308 detects that a person approaches the IC tag attaching apparatus 10. When the human body sensor 308 detects a person, each of units of the IC tag attaching apparatus 10 starts from a sleep state.

The indication light 316 changes a display color according to a state of the IC tag attaching apparatus 10. When, for example, the IC tag attaching apparatus 10 can receive a new parcel 30 and a remaining capacity is sufficient, the display color of the indication light 316 is green. Meanwhile, when the IC tag attaching apparatus 10 can receive a new parcel 30 but the remaining capacity is small, the display color of the indication light 316 becomes yellow. Further, when the IC tag attaching apparatus 10 cannot receive a new parcel 30, the display color of the indication light 316 becomes red.

Figure 3:
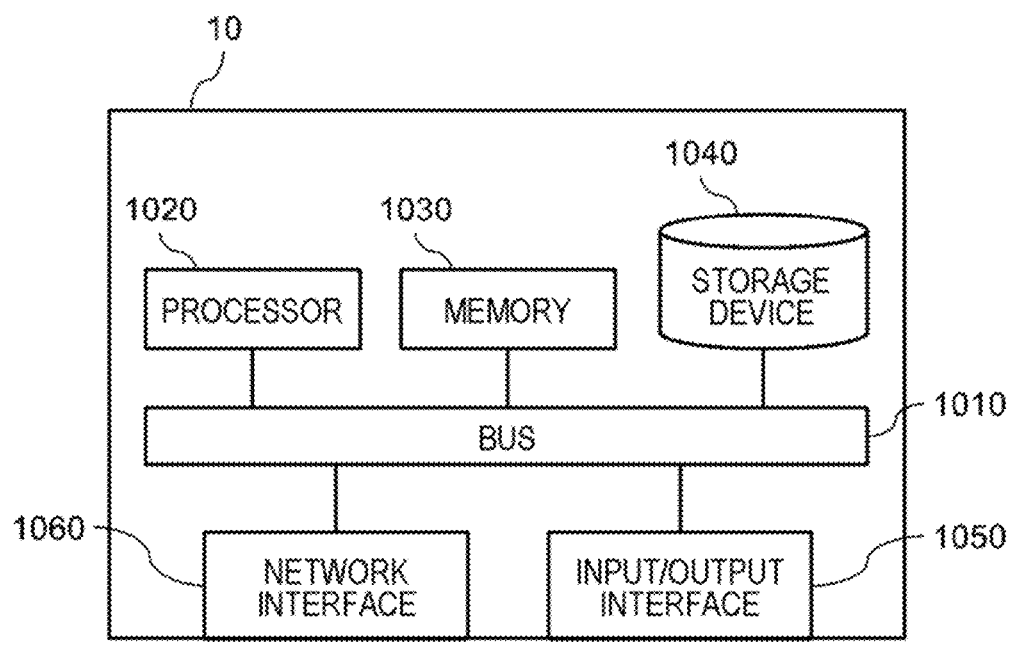
FIG. 3 is a diagram illustrating a hardware configuration example of a control system of the IC tag attaching apparatus.

FIG. 3 is a diagram illustrating a hardware configuration example of a control system of the IC tag attaching apparatus 10. The control system includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit/receive data to/from one another. However, a method of mutually connecting the processor 1020 and the like is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a removable medium such as a memory card, a read only memory (ROM), or the like. The storage device 1040 stores a program module achieving control (e.g., the detecting unit 110, the writing unit 120, the attaching unit 130, the printing unit 140, and the fee-computing unit 150) performed by each of functions of the IC tag attaching apparatus 10. The processor 1020 reads each of the program modules onto the memory 1030 and executes the read program module, and thereby achieves each function relevant to the program module.

The input/output interface 1050 is an interface for connecting the IC tag attaching apparatus 10 and various types of input/output devices.

The network interface 1060 is an interface for connecting the IC tag attaching apparatus 10 to a network. The network is, for example, a local area network (LAN) or a wide area network (WAN). A method for connecting to a network based on the network interface 1060 may be wireless connection, or may be wired connection. The IC tag attaching apparatus 10 may communicates with the parcel managing apparatus 20 via the network interface 1060.

Figure 4:
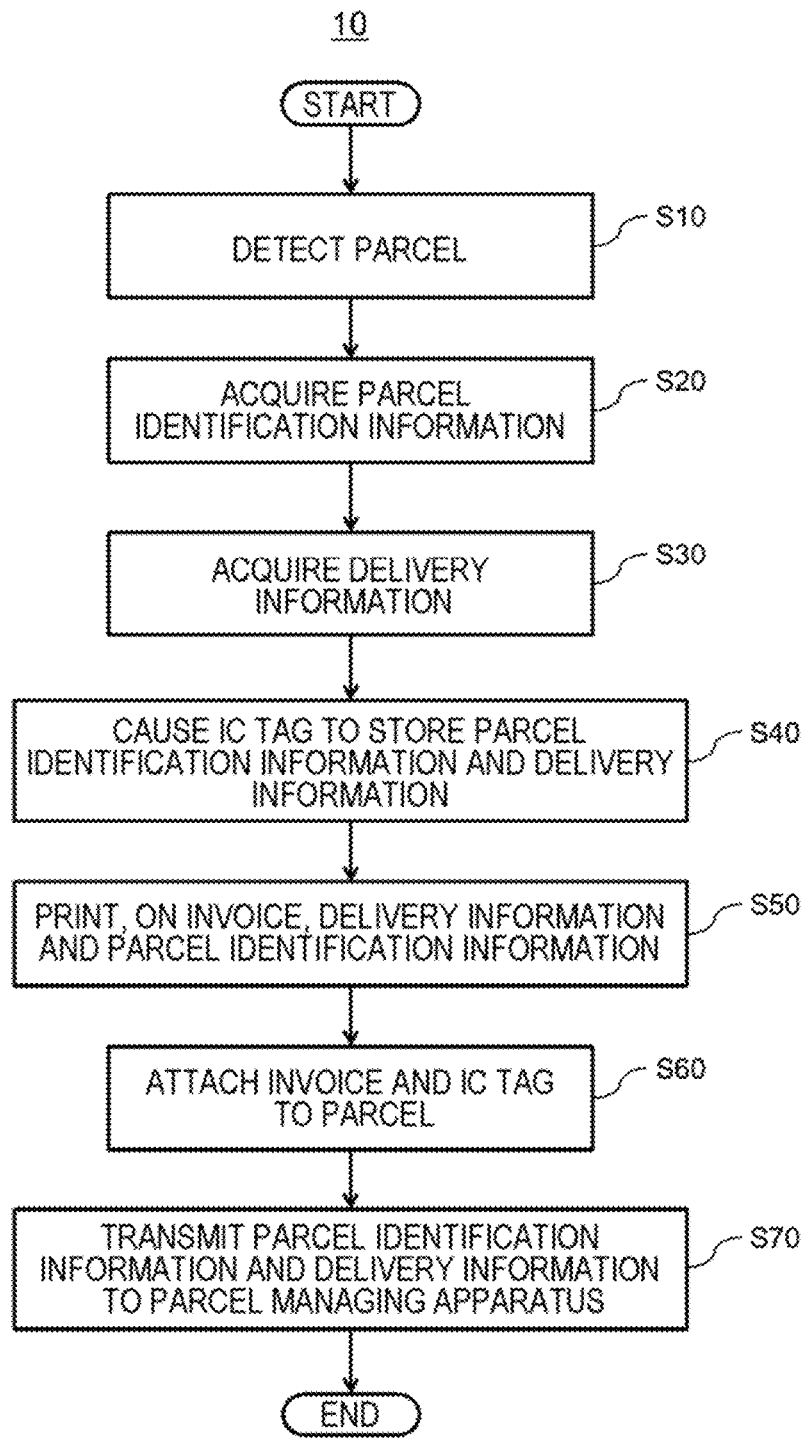
FIG. 4 is a flowchart illustrating a first example of processing executed by the IC tag attaching apparatus.

FIG. 4 is a flowchart illustrating a first example of processing executed by the IC tag attaching apparatus 10. In the example illustrated in the present figure, an IC tag is integrated with an invoice.

When a customer places a parcel on the predetermined area 302, the detecting unit 110 detects the parcel, and also computes a size of the parcel (step S10). Then, the writing unit 120 acquires parcel identification information (step S20). A specific example of an acquisition method for the parcel identification information is as described by using FIG. 1. Then, the writing unit 120 acquires delivery information (step S30). A specific example of an acquisition method for delivery information is as described by using FIGS. 1 and 2.

Then, the writing unit 120 causes an IC tag to store the parcel identification information and the delivery information (step S40). Further, the printing unit 140 prints the delivery information on an invoice. At that time, the printing unit 140 also prints, as necessary, the parcel identification information on the invoice (step S50).

Thereafter, the attaching unit 130 attaches the invoice to the parcel. At that time, the IC tag is also attached to the parcel (step S60). Then, the writing unit 120 transmits, to the parcel managing apparatus 20, the parcel identification information and the delivery information (step S70).

Note that, an order of steps S40, S50, and S60 is not limited to the above-described example. For example, execution in an order of steps S50, S40, and S60 is also employable, execution in an order of steps S60, S40, and S50 is also employable, and execution in an order of steps S60, S50, and S40 is also employable. However, when step S50 is executed before step S60, printing onto an invoice is accurately executed. Further, when step S40 is executed before step S60, storage processing into an IC tag is accurately executed.

Figure 5:
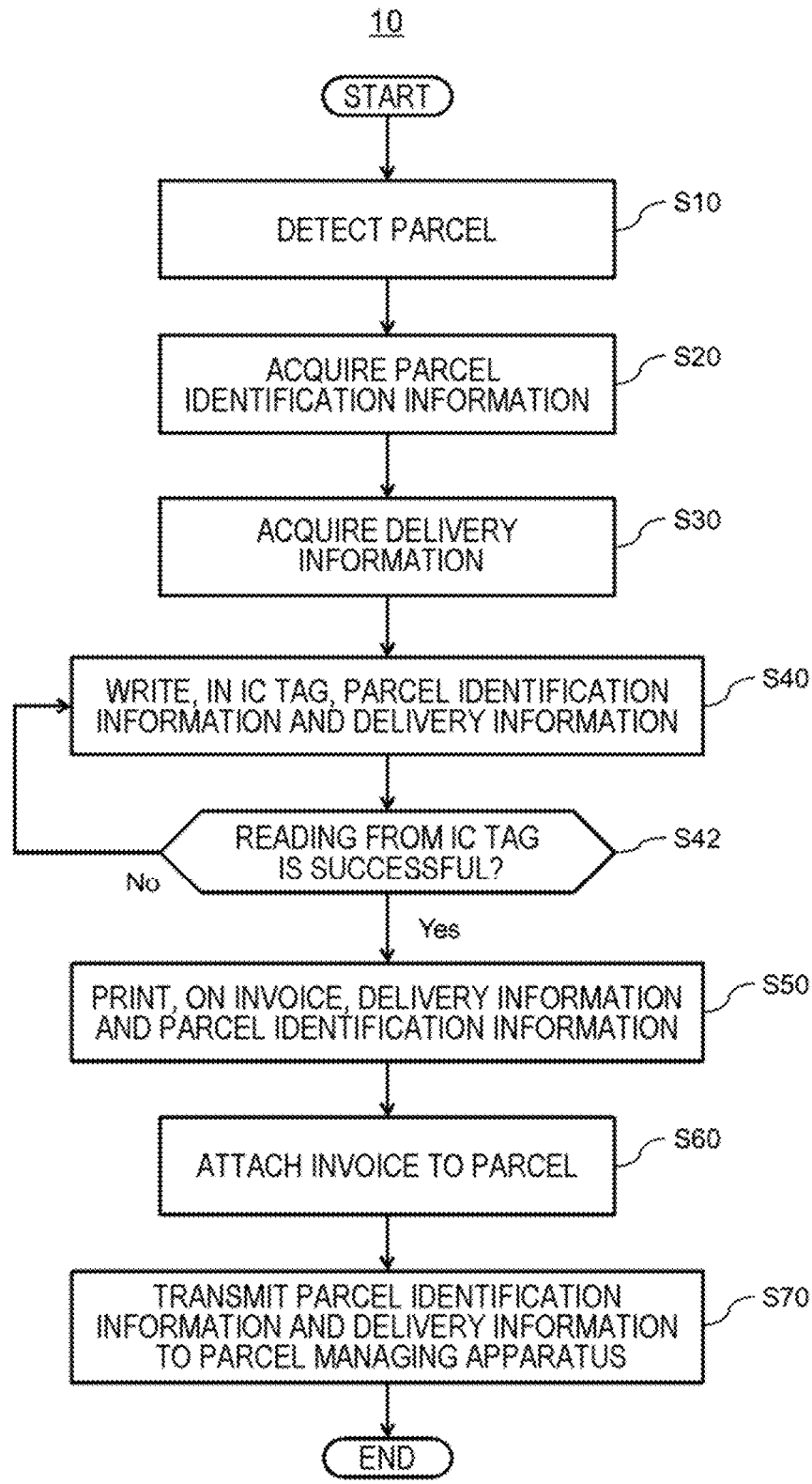
FIG. 5 is a flowchart illustrating a second example of processing executed by the IC tag attaching apparatus.

FIG. 5 is a flowchart illustrating a second example of processing executed by the IC tag attaching apparatus 10. In the example illustrated in the present figure, processing from step S10 to step S40 is similar to that of the first example illustrated in FIG. 4.

The writing unit 120 causes an IC tag to store parcel identification information and delivery information (step S40), and then reads these pieces of information from the IC tag (step S42). The writing unit 120 causes again, when the reading fails (step S42: No), the IC tag to store the parcel identification information and the delivery information (step S40). Herein, a matter that reading from the IC tag fails includes both of a case where information cannot be read at all and a case where parcel identification information and delivery information are partially lacking.

On the other hand, when the writing unit 120 successfully reads the parcel identification information and the delivery information (step S42: Yes), the IC tag attaching apparatus 10 executes processing illustrated in steps S50 to S70. These pieces of processing are similar to those of the first example illustrated in FIG. 4.

As described above, the IC tag attaching apparatus 10 attaches, when a customer brings a parcel to be delivered, an IC tag to the parcel, and also writes parcel identification information in the IC tag. For the processing, a worker does not need to do work. Therefore, work to be done when a parcel to be delivered is received can be saved. Further, when a customer brings a parcel to the IC tag attaching apparatus 10, at the site, the above-described processing is executed, and therefore a waiting time of the customer is shortened.

As described above, while with reference to the drawings, example embodiments of the present invention have been described, these example embodiments are exemplification, and various configurations other than the above-described configurations are employable.

Further, in a plurality of flowcharts used in the above-described description, a plurality of steps (pieces of processing) are described in order, but an execution order of steps to be executed according to each example embodiment is not limited to the described order. According to each example embodiment, an order of illustrated steps can be modified within an extent that there is no harm in context. Further, the above-described example embodiments can be combined within an extent that there is no conflict in content.

The whole or part of the example embodiments described above can be described as, but not limited to, the following supplementary notes.

1. An IC tag attaching apparatus including:
   a detecting unit that detects that a parcel is placed in a predetermined area:
   a writing unit that acquires parcel identification information to be provided for the parcel, and causes an IC tag to store the parcel identification information; and
   an attaching unit that attaches the IC tag to the parcel.
2. The IC tag attaching apparatus according to supplementary note 1, further including
   a reading unit that reads the parcel identification information from the IC tag having been attached to the parcel and having been written with the parcel identification information, wherein
   the writing unit causes, when the reading unit fails in reading the parcel identification information, the IC tag to store again the parcel identification information.
3. The IC tag attaching apparatus according to supplementary note 1 or 2, wherein
   the writing unit requests, after the detecting unit detects the parcel, the parcel identification information from a parcel managing apparatus that manages the parcel identification information, and causes the IC tag to store the parcel identification information being acquired from the parcel managing apparatus.
4. The IC tag attaching apparatus according to any one of supplementary notes 1 to 3, wherein
   the writing unit transmits, after causing the IC tag to store the parcel identification information, the parcel identification information to a parcel managing apparatus that manages the parcel identification information, together with location information indicating a location where the IC tag attaching apparatus is installed.
5. The IC tag attaching apparatus according to supplementary note 4, wherein
   the writing unit further transmits, to the parcel managing apparatus, at least one of information relating to a sender of the parcel, information relating to a destination, information relating to handling of a parcel, or a desired delivery date and time.
6. The IC tag attaching apparatus according to any one of supplementary notes 1 to 5, wherein
   the IC tag is integrated with an invoice of the parcel, and
   the attaching unit attaches the invoice to the parcel.
7. The IC tag attaching apparatus according to supplementary note 6, further including
   a printing unit that prints, on the invoice, at least one of a sender of the parcel, a destination, information relating to handling of a parcel, and a desired delivery date, and the parcel identification information.
8. The IC tag attaching apparatus according to supplementary note 7, wherein
   the printing unit executes printing before the attaching unit attaches the invoice to the parcel.
9. The IC tag attaching apparatus according to supplementary note 8, wherein
   the writing unit causes the IC tag to store the parcel identification information before the attaching unit attaches the invoice to the parcel.
10. An IC tag attaching method including,
    by an IC tag attaching apparatus:
    detecting that a parcel is placed in a predetermined area:
    acquiring parcel identification information to be provided for the parcel, and causing an IC tag to store the parcel identification information: and attaching the IC tag to the parcel.
11. The IC tag attaching method according to supplementary note 10, further including,
    by the IC tag attaching apparatus:
    reading the parcel identification information from the IC tag having been attached to the parcel and having been written with the parcel identification information; and
    causing, when failing in reading the parcel identification information, the IC tag to store again the parcel identification information.
12. The IC tag attaching method according to supplementary note 10 or 11, further including
    by the IC tag attaching apparatus,
    requesting, after detecting the parcel, the parcel identification information from a parcel managing apparatus that manages the parcel identification information, and causing the IC tag to store the parcel identification information being acquired from the parcel managing apparatus.
13. The IC tag attaching method according to any one of supplementary notes 10 to 12, further including
    by the IC tag attaching apparatus,
    transmitting, after causing the IC tag to store the parcel identification information, the parcel identification information to a parcel managing apparatus that manages the parcel identification information, together with location information indicating a location where the IC tag attaching method is installed.
14. The IC tag attaching method according to supplementary note 13, further including
    by the IC tag attaching apparatus,
    further transmitting, to the parcel managing apparatus, at least one of information relating to a sender of the parcel, information relating to a destination, information relating to handling of a parcel, or a desired delivery date and time.
15. The IC tag attaching method according to any one of supplementary notes 10 to 14, wherein
    the IC tag is integrated with an invoice of the parcel, the IC tag attaching method further including
    by the IC tag attaching apparatus,
    attaching the invoice to the parcel.
16. The IC tag attaching method according to supplementary note 15, further including
    by the IC tag attaching apparatus,
    printing, on the invoice, at least one of a sender of the parcel, a destination, information relating to handling of a parcel, and a desired delivery date, and the parcel identification information.
17. The IC tag attaching method according to supplementary note 16, further including
    by the IC tag attaching apparatus,
    executing printing before the attaching unit attaches the invoice to the parcel.

18. The IC tag attaching method according to supplementary note 17, further including
by the IC tag attaching apparatus,
causing the IC tag to store the parcel identification information before the attaching unit attaches the invoice to the parcel.

REFERENCE SIGNS LIST

10 IC tag attaching apparatus
20 Parcel managing apparatus
30 Parcel
110 Detecting unit
120 Writing unit
130 Attaching unit
140 Printing unit
150 Fee-computing unit
302 Predetermined area
304 Input unit
306 Code reader
308 Human body sensor
310 Claim check output unit
312 Settlement apparatus
314 Interphone
316 Indication light

What is claimed is:

1. An IC tag attaching apparatus comprising:
at least one memory configured to store instructions; and
at least one processor configured to execute the instructions to preform operations comprising:
detecting that a parcel is placed in a predetermined area;
acquiring parcel identification information to be provided for the parcel, and causing an IC tag to store the parcel identification information; and
attaching the IC tag to the parcel.

2. The IC tag attaching apparatus according to claim 1, further comprising
reading the parcel identification information from the IC tag having been attached to the parcel and having been written with the parcel identification information, wherein
causing, when fails in reading the parcel identification information, the IC tag to store again the parcel identification information.

3. The IC tag attaching apparatus according to claim 1, wherein
requesting, after detecting the parcel, the parcel identification information from a parcel managing apparatus that manages the parcel identification information, and causes the IC tag to store the parcel identification information being acquired from the parcel managing apparatus.

4. The IC tag attaching apparatus according to claim 1, wherein
transmitting, after causing the IC tag to store the parcel identification information, the parcel identification information to a parcel managing apparatus that manages the parcel identification information, together with location information indicating a location where the IC tag attaching apparatus is installed.

5. The IC tag attaching apparatus according to claim 4, wherein
further transmitting, to the parcel managing apparatus, at least one of information relating to a sender of the parcel, information relating to a destination, information relating to handling of a parcel, or a desired delivery date and time.

6. The IC tag attaching apparatus according to claim 1, wherein
the IC tag is integrated with an invoice of the parcel, and attaching the invoice to the parcel.

7. The IC tag attaching apparatus according to claim 6, further comprising
printing, on the invoice, at least one of a sender of the parcel, a destination, information relating to handling of a parcel, and a desired delivery date, and the parcel identification information.

8. The IC tag attaching apparatus according to claim 7, wherein
executing printing before attaching the invoice to the parcel.

9. The IC tag attaching apparatus according to claim 8, wherein
causing the IC tag to store the parcel identification information before attaching the invoice to the parcel.

10. The IC tag attaching apparatus according to claim 1, wherein the operations further comprise:
acquiring information on current capacity for delivery; and
controlling a lighting state of an indicator based on the information to indicate the current capacity for delivery.

11. An IC tag attaching method comprising,
by an IC tag attaching apparatus:
detecting that a parcel is placed in a predetermined area;
acquiring parcel identification information to be provided for the parcel, and causing an IC tag to store the parcel identification information; and
attaching the IC tag to the parcel.

* * * * *